United States Patent
Jain (10) Patent No.: US 6,535,490 B1
(45) Date of Patent: *Mar. 18, 2003

(54) HIGH AVAILABILITY SPANNING TREE WITH RAPID RECONFIGURATION WITH ALTERNATE PORT SELECTION

(75) Inventor: Vipin K. Jain, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,996

(22) Filed: Apr. 22, 1999

Related U.S. Application Data (60) Provisional application No. 60/122,854, filed on Mar. 4, 1999.

(51) Int. Cl.[7] ............................................... H04L 12/28
(52) U.S. Cl. ...................... 370/256; 370/254; 370/401; 370/255; 370/408; 370/428; 709/239; 709/242
(58) Field of Search .................................. 370/256, 401, 370/408, 255, 428; 709/239, 242

(56) References Cited

U.S. PATENT DOCUMENTS

| | | | | |
|---|---|---|---|---|
| 5,790,808 A | * | 8/1998 | Seaman .................. | 395/200.53 |
| 6,032,194 A | * | 2/2000 | Gai et al. ................... | 709/239 |
| 6,081,512 A | * | 6/2000 | Muller et al. ............... | 370/256 |
| 6,188,694 B1 | * | 2/2001 | Fine et al. .................. | 370/402 |
| 6,262,977 B1 | * | 7/2001 | Seaman et al. ............. | 370/256 |
| 6,330,229 B1 | * | 12/2001 | Jain et al. ................... | 370/256 |

* cited by examiner

Primary Examiner—Douglas Olms
Assistant Examiner—Van Nguyen
(74) Attorney, Agent, or Firm—Mark A. Haynes; Haynes Beffel & Wolfeld LLP (57) ABSTRACT

An improvement to the spanning tree protocol provides for identifying a port on the bridge in the alternate port role which qualifies as a candidate root port. Upon an event causing a topology change resulting in a particular port changing from the candidate root port role to the root port role and the previous root port changing to the designated port role, the process allows the previous root port to have the forwarding state without requiring transition through the listening and forwarding states. Qualification as a suitable candidate root port according is based upon propagating a message from the root bridge, such as a bridge protocol data unit ("BPDU") message, carrying the identifier of the port on the root bridge from which the message originates. Logic in the bridges is able to identify the branch of the tree from which the message originates, and to select the candidate root port in response to the branch information. Thus, the port on a different branch than the root is a suitable candidate root port. A port on the same branch as the root is suitable if it has recently received (such as within one Hello time in the standard Spanning Tree) updated configuration information from its upstream bridge (Designated Bridge on the port), such as by a configuration BPDU.

21 Claims, 4 Drawing Sheets

FIG. 1A

BREAK RESULTS IN S6
RECONFIGURATION
USING BAD INFO.

FIG. 1B

S6 RECONFIGURATION
RESULTS IN LOOP

(BPDU FORMAT SUPPORTING CANDIDATE ROOT SELECTION)

| Field | Octet |
|---|---|
| Protocol Identifier | 1, 2 |
| Protocol Version Identifier | 3 |
| BPDU Type | 4 |
| Flags | 5 |
| Root Identifier | 6, 7, 8, 9, 10, 11, 12, 13 |
| Root Path Cost | 14, 15, 16, 17 |
| Bridge Identifier | 18, 19, 20, 21, 22, 23, 24, 25 |
| Port Identifier | 26, 27 |
| Message Age | 28, 29 |
| Max Age | 30, 31 |
| Hello Time | 32, 33 |
| Forward Delay | 34, 35 |
| Port on Root ID | 36, 37 |
| Hop Count | 38, 39 |

FIG. 4

HIGH AVAILABILITY SPANNING TREE WITH RAPID RECONFIGURATION WITH ALTERNATE PORT SELECTION

RELATED APPLICATION DATA

Applicant claims the benefit of Provisional Application No. 60/122,854 entitled Method and Apparatus to Identify Alternate Ports That Can Serve as Potential Root Port to Provide Loop-free Connectivity in a Modified Spanning Tree, filed Mar. 4, 1999.

The present application is related to co-pending U.S. patent application Ser. No. 09/141,803 entitled High Availability Spanning Tree with Rapid Reconfiguration, filed Aug. 28, 1998, invented by Michael Seaman and Vipin Jain; is related to co-pending U.S. patent application Ser. No. 09/188,852 entitled Spanning Tree with Rapid Forwarding Database Updates, filed Nov. 9, 1998, invented by Vipin Jain and Michael Seaman; and is related to co-pending U.S. patent application Ser. No. 09/232,742 entitled Improved Spanning Tree with Rapid Propagation of Topology Changes, filed Jan. 15, 1999, invented by Michael Seaman; and such applications are incorporated by reference as if fully set forth herein.

BACKGROUND OF THE INVENTION

1. Field of the Invention

The present invention relates to network protocols and to network intermediate devices executing such protocols; and more particularly, to algorithms for managing a tree of network devices for a data network according to a spanning tree protocol.

2. Description of Related Art

Local area networks ("LANs") specified according to Institute of Electrical Electronic Engineers ("IEEE") Standards for Local and Metropolitan Area Networks under section 802.x of all types may be connected together by media access control ("MAC") bridges. MAC Bridges interconnect LAN segments so that stations connected to the LANs operate as if they were attached to a single LAN for many purposes. Thus a bridged LAN provides for the interconnection of stations attached to LAN segments of different MAC types, for an increase in the physical extent, for the number of permissible attachments and the total performance of a LAN, and for the partitioning of physical LAN support for administrative or maintenance reasons. The MAC bridge is specified according to the IEEE standard 802.1D (IEEE Std. 802.1D-1990, IEEE Standards for Local and Metropolitan Area Networks: Media Access Control (MAC) Bridges.).

When a bridged network is established, it is possible to create loops in the network by providing more than one path through bridges and LAN segments between two points. Thus, according to the 802.1D standard, an active topology for the bridged network is maintained according to the spanning tree protocol which is described in the standard. The spanning tree protocol automatically establishes a fully connected (spanning) and a loop-free (tree) bridged network topology. It uses a distributed algorithm that selects a root bridge and the shortest path to that root from each LAN. Tie breakers are used to ensure that there is a unique shortest path to the root, while the uniqueness of the root is guaranteed by using one of its MAC addresses as part of a priority identifier.

Every LAN in the network has one and only one "designated port" providing the shortest path to the root for that LAN, through the bridge of which the designated port is a part. The bridge is known as the "designated bridge" for that LAN.

Thus, bridges other than the root bridge at the root of the network can be termed a branch bridge. Every branch bridge has a "root port" which is the port providing the shortest path to the root for that bridge. Ports other than the root port are designated ports, or alternate ports, according to the standard. An alternate port is connected to a LAN for which another bridge is the designated bridge, and is placed into a blocking state so that frames are not forwarded through that port.

Thus, the frame forwarding path through any bridge is between its root port and its designated ports. When spanning tree information has been completely distributed and is stable, this connectivity will connect all of the LANs in a loop-free tree.

When a bridge first receives spanning tree information that dictates new connectivity through that bridge, it does not establish the new connectivity immediately. Ports that were previously connected as either the root port or as a designated port, but are no longer in the forwarding state, are immediately made blocking. However, the transition to a forwarding state of ports that were previously not connected in a forwarding role is delayed. The delay serves two purposes:

(1) Frames forwarded on the previous topology may still be buffered by bridges in the network. Thus, an instantaneous bridge to the new topology can cause these frames to be forwarded back to their LAN of origin, causing duplication of the frame once; and (2) New spanning tree information in the network may not have been fully distributed yet. Thus an immediate change to a new topology may cause temporary loops. These loops could generate high traffic volumes, disrupting end stations, causing frame loss in bridges, and possibly delaying the propagation of spanning tree information further.

According to the spanning tree protocol of the standard, each port on a bridge can assume a blocking state in which frames are not forwarded through the port, and a forwarding state in which frames are forwarded through the port. For a transition from the blocking state to the forwarding state, the protocol requires the port to proceed through transitional states referred to as the listening state and the learning state.

In the listening state, the port is preparing to participate in frame relay; however, frame relay is temporarily disabled to prevent temporary loops. In the listening state, the port monitors bridge protocol data unit ("BPDU") frames or other information related to the topology in the network for an interval referred to as the forward delay timer. If no information is received which causes a change in state of the port before expiry of the forward delay timer, then the port transitions to the learning state.

In the learning state, the port continues to prepare for participation in frame relay. The relay is temporarily disabled to prevent loops. In this state, in addition to monitoring the BPDU frames and other information related to the operation of the spanning tree algorithm, the port learns information about end stations that are accessible through the port for use in the forwarding of frames once the frame enters the forwarding state. Upon expiration of the forward delay timer in the learning state, if no better information about the protocol is received, then the port assumes the forwarding state. Thus, the transition from a blocking state to the forwarding state takes two times the forward delay timer interval. A significant amount of time may pass from the time of detection of a change in topology causing a transition from the blocking state to the forwarding state, until the time in which the forwarding state is assumed. This time may be as long as 20 to 50 seconds in some cases.

Convergence of a bridged network in situations involving changing of spanning tree topology can therefore cause significant loss of service situations, particularly in networks that carry real time data. For example, the use of data networks and the Internet for audio and video transmissions of real time signals is increasing. Twenty to fifty second convergence times for these uses of the data network can cause unacceptable glitches. Accordingly, it is desirable to provide a technique to improve the availability of a bridged network in the face of changes in topology.

Work is being done in the Institute of Electrical Electronic Engineers ("IEEE") 802.1 working group to speed up the convergence of the spanning tree in the face of topology changes. One such proposal converts an alternate port to the root port of the bridge if the original root port fails. An alternate port on a bridge is connected to a segment on another path to be root bridge. According to the proposals, addresses are also transferred from the failed root port to the new root port. The new root port goes into a forwarding state immediately after the transition. This process is described in our previous U.S. patent application Ser. No. 09/141,803 which is incorporated by reference above.

An alternate port on a bridge has information about the designated bridge/port and the designated cost on the segment to which it is connected. When the alternate port assumes the root port role, BPDUs are sent by the bridge with information indicating the change. The spanning tree proposal also requires downstream bridges to accept inferior information from a designated bridge. Since an alternate port is chosen as the root port, the new information will be inferior to the previously held information. When the changing bridge advertises the inferior information on its designated ports, downstream bridges receive this information and calculate the report and root path cost using. As a result of the calculation, downstream bridges either remain attached to the original root port, or find an alternate and better root port. The new and inferior information is then propagated downstream until all the downstream bridges have seen the change and the spanning tree converges.

Figure 1A:
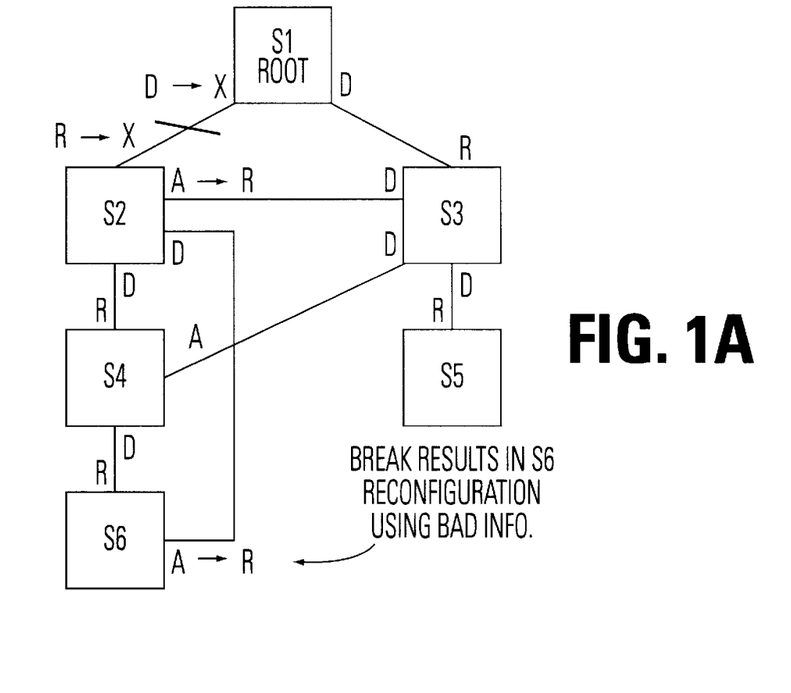
FIGS. 1A and 1B illustrate a network topology that is subject to loops according to the prior art.
Figure 1B:
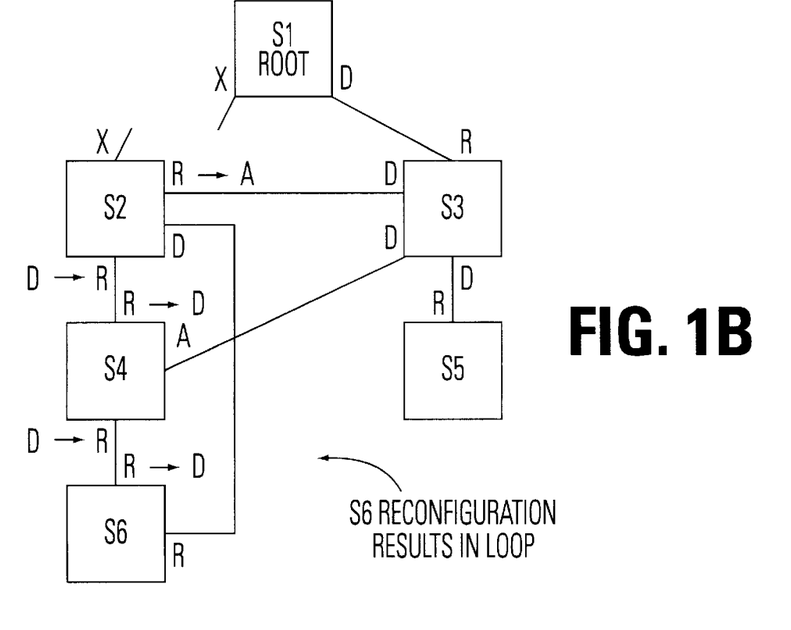

However, selecting an arbitrary alternate port as the root port in response to new path cost information received from an upstream bridge can result in loops in some topologies. For example, such loops may occur in the topologies shown in FIG. 1A and FIG. 1B. In this topology, root bridge S1 has a first designated port connected to a corresponding root port on bridge S2 and a second designated port connected to a corresponding root port on bridge S3. Bridge S3 has designated ports connected to a corresponding root port on bridge S4 and to a corresponding alternate port on bridge S6. Bridge S4 has a designated port coupled to bridge S6. On the other branch, bridge S3 has designated ports connected to bridges S5, S2, and S4. Bridges S2 and S4 have alternate ports coupled to corresponding designated ports on bridge S3. Bridge S6 has an alternate port coupled to the corresponding designated port on bridge S2. In the scenario shown in FIG. 1A, if the root port on bridge S2 fails, the alternate port connected to bridge S3 will transition to the root port role. Assuming that the path between bridge S3 and the original root port S1 is high, the bridge S2 will then begin propagating the path cost information which will appear inferior at bridges S4 and S6. Other events can also cause inferior information to be propagated down this branch of the tree. Because the path through bridge S4 to bridge S6 may be fast, there is the potential that the inferior information will be received on the alternate port of bridge S6. Because the path cost through the alternate port on bridge S6 will not reflect the failure, the inferior information received on the root port of bridge S6 could cause the bridge to change from its previously alternate port into the root port role and from its previously root port into the designated port role. In this case, bridge S6 will begin propagating information to bridge S4 and S2 through the previously root port, now in the designated port role. As shown in FIG. 1B, the previously designated ports on bridges S2 and S4 can transition to the root port role in response to the information received from bridge S6, if the information from S6 is better than the information received from bridge S2. This sequence of events would create a loop among bridges S2, S4 and S6. The injected information would loop among these bridges with increased root cost and message age in each hop, until one of the bridges finds an alternate port providing better information outside the loop. For example, the alternate port on bridge S4 could receive information from bridge S3 to break the loop. Alternatively, the message age time could exceed the maximum value causing a new root port selection to break the loop. However, the data path which would cause this loop will not open in the prior art, because the transition from root port to designate port invokes a waiting interval during this convergence. However, during the convergence, the bridges do not forward packets. When the convergence timer has expired, the topology will normally converge in the existing standard spanning tree, preventing loops.

Accordingly, it is desirable to provide a method that identifies appropriate alternate ports which are good candidates for becoming the root port without forming a loop, while allowing for a more rapid convergence of the spanning tree.

SUMMARY OF THE INVENTION

The present invention provides techniques to select an alternate port in a manner that prevents loops, and allows immediate transition of a previously root port to the designated port role.

Thus, the present invention can be characterized as an improvement to the spanning tree protocol which provides for identifying a port on the bridge in the alternate port role which qualifies as a candidate root port. Upon the receipt of changed path cost information, or other events causing a selection of a new root port, the candidate root port transitions to the root port role and forwarding state immediately, without traversing the listening and learning states of the standard protocol and without requiring satisfaction of the conditions of such transitional states. Also, the previously root port may transition into the designated port role without wait states, which allows rapid, loop-free convergence of the spanning tree.

The present invention provides the mechanisms to identify alternate ports, termed "candidate root ports" herein, that are candidates for becoming the root ports in the event of a topology change. Not all of the alternate ports on a bridge can serve as the root port in an arbitrary spanning topology. Because some alternate ports are connected to segments that might lead to loops, such loops result in the "counting to infinity" problem as is well known in the routing world (Routing Information Protocol or "RIP"). Methods are provided to identify ports in a candidate root role alternate ports that lead to loop-free alternate paths to the root bridge. When a root port selection process causes the root port on a bridge to change, one of the selected candidate root ports (the one with the least root path cost) can be selected as the root port and the modified spanning tree algorithms speed up the convergence and reduce address learning.

According to the present invention, qualification as a suitable candidate root port is based upon propagating a message from the root bridge, such as a bridge protocol data unit ("BPDU") message, carrying the identifier of the port on the root bridge from which the message originates. For the standard spanning tree protocol, the port identifier from the root bridge is provided in addition to the identifier of the port of the bridge from which the BPDU is received. Logic in the bridges is able to identify the branch of the tree from which the message originates, and to select the candidate root port in response to the branch information. Thus, a port on a different branch than the root is a suitable candidate root port. A port on the same branch as the root is suitable if it has recently received (such as within one Hello time in the standard spanning tree) updated configuration information from its upstream bridge (designated bridge on the port), such as by a configuration BPDU. If it has not received recent configuration information, then the alternate port can provoke a new BPDU, such as by sending inferior information on the affected segment which causes the upstream bridge to respond with better information.

Downstream bridges that are not acting according to the protocol (i.e., misbehaving bridges) may also cause loop conditions. Techniques are provided to detect a misbehaving downstream bridge. In a first technique, the configuration BPDU is enhanced to include a hop count from the root bridge. If an alternate port receives a BPDU with a lower hop count than the root port is receiving, then the alternate port is a suitable candidate root port. In an alternative approach, an alternate port is a suitable candidate root port if the MAC address of the designated bridge on the alternate port has been learned on the root port on the bridge.

According to the present invention, network intermediate devices are provided for a network having a plurality of local area network ("LAN") segments. The devices comprise a plurality of ports coupled to LAN segments in the network. Topology management resources on the devices manage the plurality of ports according to a spanning tree algorithm, in order to set an active topology for the plurality of ports. The topology management resources include memory which stores parameters specifying the active topology. The parameters include an identification of a root of the network, an identification of a port in the plurality of ports for a root port role to be used for a path to the root, an identification of one or more ports in the plurality of ports for designated port roles to be used for paths between the root and the respective LAN segments coupled to the one or more ports, and an identification of one or more ports in the plurality of ports for alternate port roles (for example, by being neither a root nor designated port role). Logic in the topology management resources computes states for the ports in the plurality of ports in response to the parameters. This logic places the port in the root port role into a forwarding state, places the one or more ports in the designated port roles into a forwarding state, and places the one or more ports in the alternate port roles into a blocking state. In addition, logic is provided to manage the transition of the states of the ports in the plurality of ports in response to a change in the active topology. For a port changing from the alternate port role to a designated port role, the logic causes a transition from the blocking state to a transitional state, such as a state involving the listening and learning processes of the 802.1D standard. Upon satisfaction of a condition of the transitional state, the logic causes a transition to the forwarding state. Upon an event causing a topology change resulting in a particular port changing from the candidate root port role to the root port role and in the previous root port changing to the designated port role, the process allows the previous root port to enter into the forwarding state without requiring transition through the listening and forwarding states. Qualification as a suitable candidate root port is based upon propagating a message from the root bridge, such as a BPDU message, which carries the identifier of the port on the root bridge from which the message originates. Logic in the bridges is able to identify the branch of the tree from which the message originates, and to select the candidate root port in response to the branch information. Thus, the port on a branch other than the root is a suitable candidate root port. A port on the same branch as the root is suitable if it has recently received (such as within one Hello time in the standard spanning tree) updated configuration information from its upstream bridge (designated bridge on the port), such as by a configuration BPDU. Thus, in the case of a suitable alternate port changing to the root port role, the previously root port changing to the designated port role may transition immediately into a forwarding state without going through transitional stages, and without forming a loop.

Accordingly, the present invention provides enhancements to the spanning tree protocol based on identifying port roles including the root port role, the designated port role, an alternate port role, and, in shared media networks, a backup port role. Transitions from the blocking state to the forwarding state, and from the forwarding state to the blocking state, depend upon the particular role of the port.

Other aspects and advantages of the present invention are shown by the figures, the detailed description, and the claims which follow.

DETAILED DESCRIPTION

Figure 2:
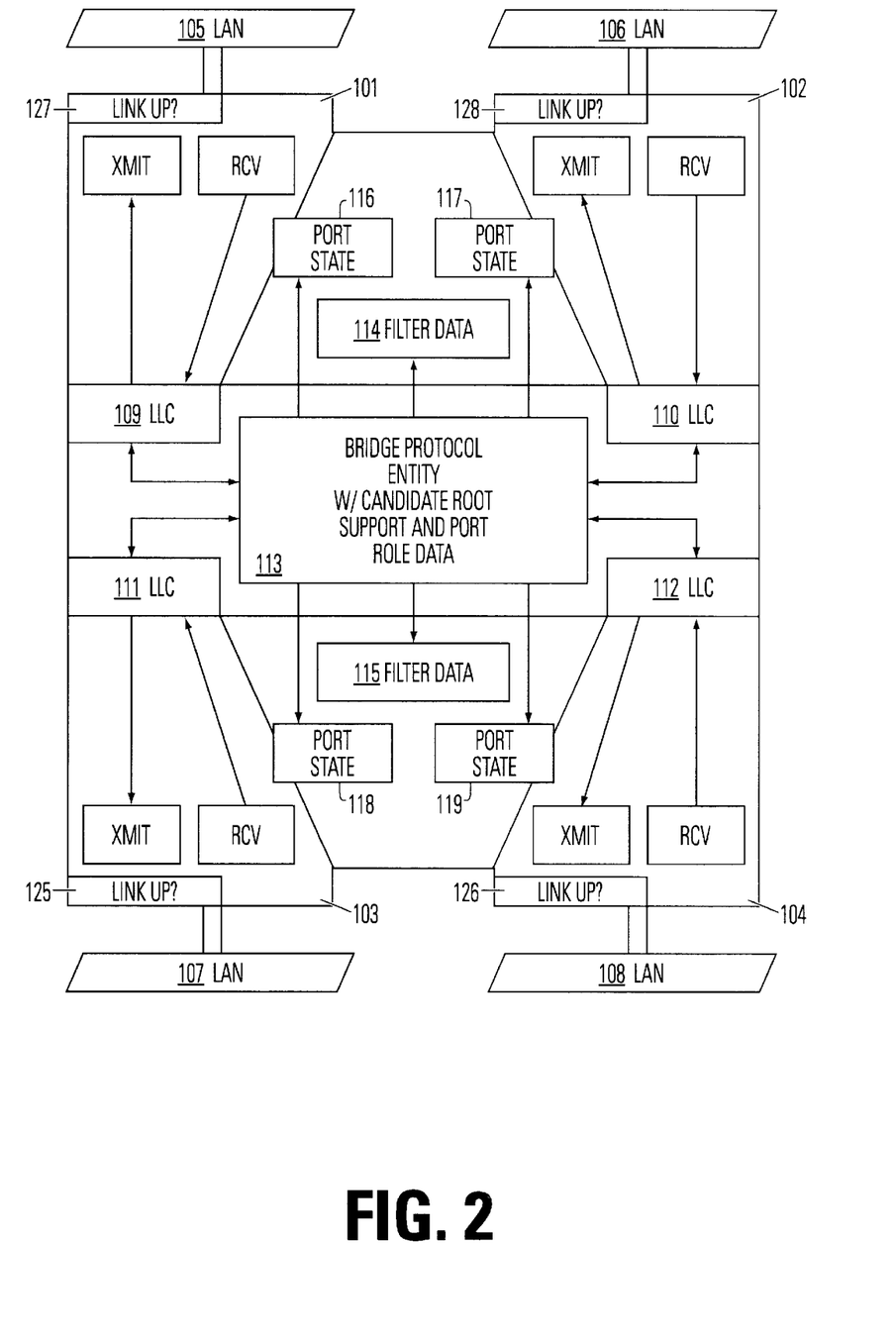
FIG. 2 is a block diagram of a bridge that is implementing the direct to root support and port role data storage according to the present invention.

A detailed description of the present invention is provided with respect to the figures. FIG. 2 provides a block diagram of the bridge functionality in the spanning tree entities, to be used, for example, in the devices of FIGS. 1A and 1B, as enhanced according to the present invention. FIG. 2 is drawn in the style adapted in the IEEE 802.1D standard of FIGS. 3–6, and is enhanced to provide four ports.

Thus, the bridge illustrated in FIG. 2 includes ports 101, 102, 103, and 104. Each of the ports 101–104 is coupled to a respective LAN segment 105–108. The ports support a MAC layer transmit and receive functionality. The logical link control layer LLC entities 109–112 provide a connection to bridge protocol entity 113 according to the present invention. The bridge protocol entity provides memory for storing parameters that identify port roles, and for managing the transition of port state information for the plurality of ports. Furthermore, the bridge protocol entity maintains filter data 114 and 115 for the frames being transmitted among the ports, and maintains port state information 116, 117, 118, and 119 for the respective ports.

Linkup monitors 125–128 are included for each port, which signal loss-of-light or loss-of-link beat situations to the protocol entities. These situations can trigger topology changes according to the present invention very quickly.

The bridge protocol entity includes logic for accepting, expiring, updating, and propagating configuration information. In particular, if the protocol entity receives a BPDU sent on a LAN by the current designated bridge from the designated port on such a bridge, that BPDU is accepted and processed even if it carries information inferior to the information previously received. Also, the message acceptance rules require a number of other changes for accepting, updating, expiring, and propagating configuration information. For example, in some circumstances, when a root port receives a BPDU, the bridge will recompute the port role. As a result, the receiving bridge may change the root port before the change into a designated port after the change. In fact, this change can simultaneously occur to several bridges on shared media LANs. The result in this case would be that all the bridges assuming the designated role send BPDUs announcing themselves as designated, and causing election of a new designated bridge for the LAN.

Following a configuration update for any reason, such as a message reception, a message expiry, or a management change, a BPDU is sent on every port for which the bridge was designated prior to the change, if the information on the port has been updated. Thus, protocol entities between a port designated prior to the change and the leaves of the tree are notified that the state of its designated port may have changed.

Additionally, if a BPDU is received on the port which continues to be or becomes the root port, BPDUs are transmitted on all the ports for which the bridge is designated after updating the configuration. Thus, all protocol entities between the root port in control after the change and the leaves of the tree are notified of the new root port. Furthermore, a bridge transmits BPDUs on all ports after first becoming or believing itself to be the root of the network.

Proposed changes in the spanning tree algorithm which create a possibility of transmitting inferior information increase the risk that an immediate fail over of a root to an alternate port will cause loops. According to the present invention, candidate root ports are selected so as to avoid such loops.

The protocol entity identifies those alternate ports that are either connected on the other side of the root bridge (another branch of the tree relative to the root port) or are on the same side as the root port but are not affected by the broken connectivity. These procedures are described below.

In the current (as well as in the modified spanning tree), the root bridge periodically generates a configuration BPDU that carries the root ID, the root path cost, and the port ID that leads to the root bridge. Downstream bridges use this information to generate configuration BPDUs. However, as the BPDU is propagated down the tree, the port ID is replaced with the port ID of the transmitting designated port by the downstream bridges. As described below with respect to FIG. 3, another field is added to the BPDU format which preserves the original root port ID, i.e., the port on the root bridge from which BPDU originated. Upon receiving a configuration BPDU, a bridge remembers and stores the root port ID on its root port. The root port ID is also propagated in the configuration BPDUs by designated bridges. Depending upon the computation model, as discussed later, and upon the needs of particular installations of the invention Remembering the root port ID on alternate ports may or may not be required.

Another method of learning whether an alternate port is connected on the same side of the root bridge (relative to the root port) is to identify the port on which the MAC address of the designated bridge connected to an alternate port has been learned. Because addresses are not learned on alternate ports, the MAC address of the designated bridge would be learned on:

A root port;

A designated port; or

None of the ports.

Since bridges receive and process configuration BPDUs on alternate ports, the MAC address of an advertising designated bridge received on the particular alternate port is known. If this MAC address has also been learned on a designated port, there is a misbehaving downstream bridge connected through a designated port. It is misbehaving because a downstream bridge should never have a port which becomes a designated port on the connected segment. If this particular alternate port is chosen as the root port when the original root port fails, it will certainly result in a loop. If the MAC address has been learned on a root port, the connectivity is through a bridge on the other side of root bridge or through an upstream bridge on the same side of the root bridge. If the address has not been learned, learning can be provoked via mechanisms like Reverse Address Recordation Protocol ("RARP") (using the MAC address of the designated port on the connected segment). Alternatively, it can be requested from the peer, for example, by requesting the peer to periodically send an ARP broadcast. Along with, or as an alternative to, the hop count, this information is used to identify the alternate ports that are suitable candidate root ports, e.g., candidates for becoming the root port, if the original root port changes to designated port.

In one alternative, a new field is added in the configuration BPDU that describes the hop count to the root bridge (either originated by the root bridge as 0 or by the next level bridges as 1). This hop count is incremented by each bridge propagating the BPDU downstream. The hop count is recorded on the root ports which receive the BPDUs. The hop count may or may not be recorded on alternate ports depending upon the computation model.

An alternate port is a suitable candidate root for becoming the root port when either:

1. The root port ID received in the configuration BPDU (on the alternate port in question) is different from the root port ID received on the root port;

2(a). The root port ID received in the configuration BPDU is the same as that received on the root port AND a configuration BPDU has recently been seen on the alternate port, AND (optionally, to handle misbehaving bridge case)

2(b). The MAC address of the designated bridge has been learned on the root port OR the hop count received in the configuration BPDU is less than that received on the root port.

If a BPDU has not been recently seen, for example, in one Hello time period, the protocol entity transmits inferior information (with a very high root cost->infinity) on the connected segment which will cause the designated bridge and the designated port to respond with better information.

This step ensures that the current information from the designated bridge and the designated port is available and also prevents this bridge from injecting stale information back into the network.

Only the current (latest) configuration BPDU is needed to break the loop. If a BPDU has not been recently received, provoking a response as described above is sufficient to break any potential loop. The hop count and the learning of the MAC address handles the case of the misbehaving downstream bridge. The root port ID is used to predetermine the "safe" alternate paths with high degree of confidence in common network topologies.

Candidate root ports are pre-determined and marked as candidate root ports upon receiving configuration BPDUs or when needed, for example, at the time of a topology change. For example, the root port IDs and the hop counts received on the root port and on the alternate ports are stored in one approach. When the root port fails, this information is used to calculate the potential root port. Alternatively, when configuration BPDUs are received on alternate ports, the information is compared to the information stored on the root port and accordingly, candidate alternate ports are marked. When there is a change in the root port, the candidate root port which is marked and has the least root path cost, is selected immediately.

Figure 3:
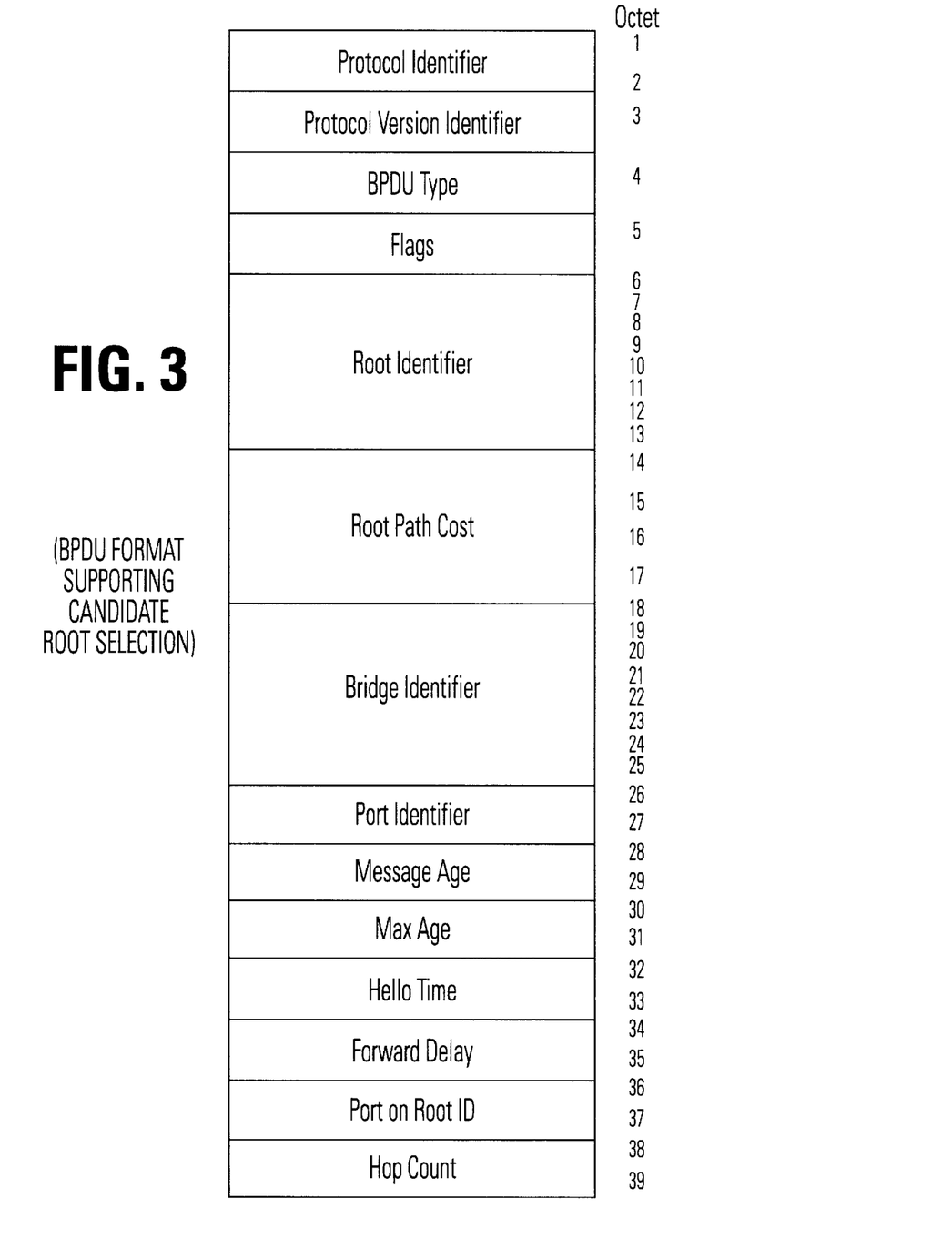
FIG. 3 is a diagram of a configuration BPDU that is based on the prior art IEEE 802.1D standard, and enhanced according to the present invention.

FIG. 3 illustrates the format of a BPDU based on the prior art spanning tree algorithm, enhanced to support candidate root selection by including the Port on Root Identifier and the Root Hop Count fields according to the present invention. In the example of FIG. 3, the Port on Root Identifier is placed at bytes 36 and 37. The Root Hop Count is placed at bytes 38 and 39. Alternate arrangements of the messages carrying these parameters include other orders of the parameters, other field sizes, as well as the inclusion of the parameters in different messages. Logic is included in suitable structures in the bridge protocol entities to support and to propagate BPDUs according to this format.

Figure 4:
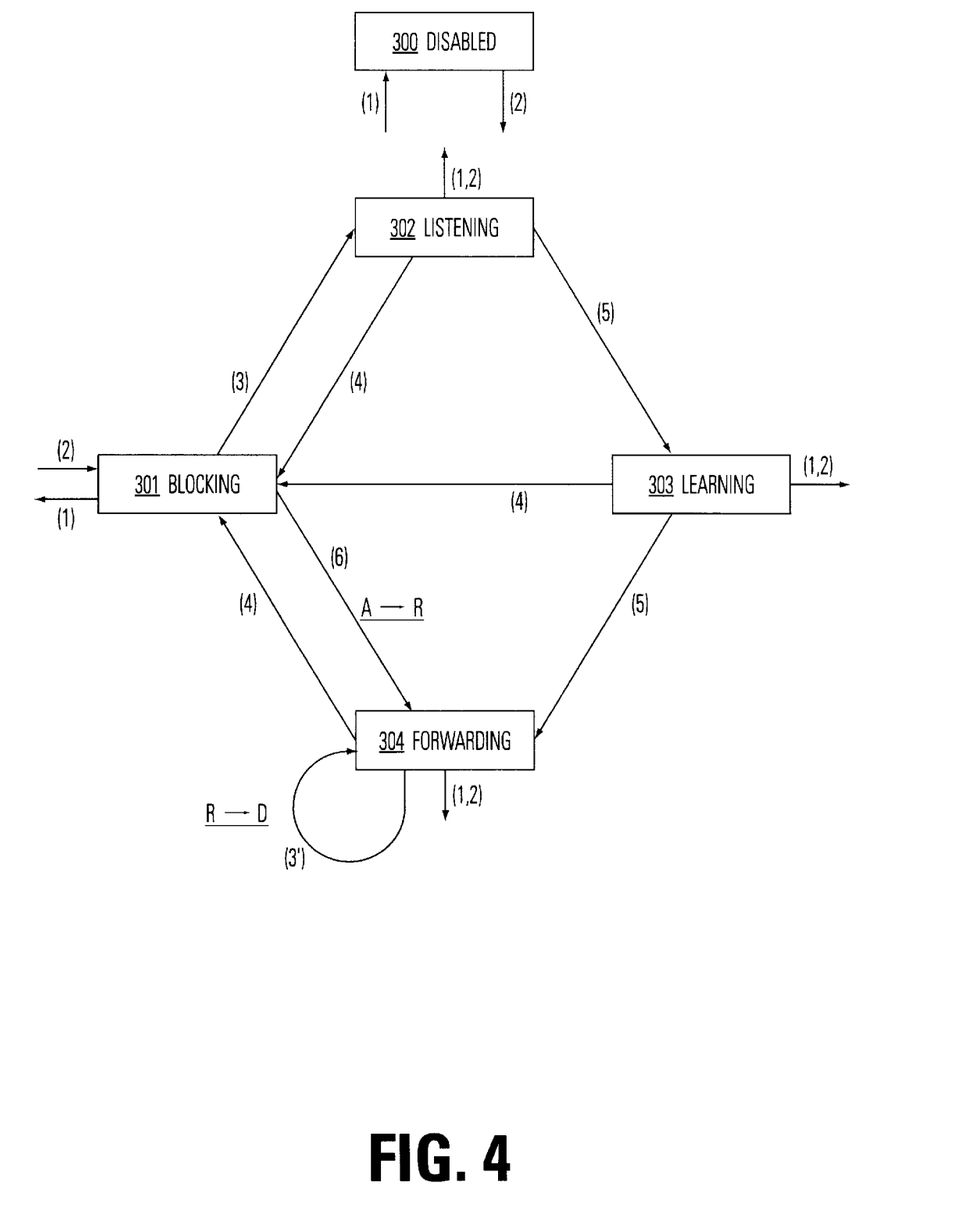
FIG. 4 is a state diagram for a port on a bridge modified according to the present invention.

FIG. 4 illustrates the state transitions which occur according to the role assumed after the change, and the role existing before the change. Thus, in FIG. 4, the ports can assume a disabled state 300, a blocking state 301, a listening state 302, a learning state 303, and a forwarding state 304. These states behave essentially as defined in the specification for the 802.1D standard in the preferred embodiment. Transitions from the disabled state into an active state occur on transition (2) to the blocking state 301. Transitions out of the blocking state 301 into the disabled state 300 occur on transition (1). From the listening state 302, the learning state 303, or the forwarding state 304, any transition to become enabled (1) or to become disabled (2), causes a transition into the disabled state 300.

In FIG. 4, the transition (3) corresponds to a change in topology that requires the alternate port to become a designated port, both in the condition that the new root port was not previously forwarding prior to the change, and in the condition that the new root port was previously forwarding prior to the change. This transition occurs from the blocking state 301 to the listening state 302. According to the present invention, the transition (3') is added from the forwarding state 304 to the forwarding state 304 for transition in port role from the root port role to the designated port role. This transition (3') occurs if the port which is assuming the root port role as a result of the event causing the change was previously a candidate root port in the alternate port role.

In some embodiments, the transition (3') includes a transition to the blocking state 301 (not shown) and then back to the forwarding state 304 after a short time. The short time allows computation of the candidate root port, but is insufficient to act as the transitional conditions through the listening and learning states.

The transition (4) occurs when the port assumes an alternate port role. In FIG. 4, this transition (4) occurs from any of the listening, learning, or forwarding states 302–304 into the blocking state 301. The transition (5) occurs upon expiration of the forward delay timer. This transition occurs from the listening state 302 into the learning state 303, or from the learning state 303 into the forwarding state 304. The transition (6) is also included in the preferred embodiment, and occurs upon transition to the root port role from the alternate port role, including from the candidate root role to the root port role. The transition (6) occurs from the blocking state 301 into the forwarding state 304 without traversing any transitional states.

Thus, the protocol entity of FIG. 2 includes memory that stores parameters that specify the active topology. The parameters identify a root of the network, a port for a root port role to use for a path to the root, and one or more ports in the plurality of ports as designated port roles. Also, ports in the alternate port role are identified by the parameters stored in the memory. Candidate root ports are identified by stored parameters or by calculation at the time of a topology change. For a port changing from the alternate port role to a designated port role, logic causes a transition from the blocking state to a transitional state, including the listening and learning states 302 and 303, prior to changing into the forwarding state 304. For a port changing from the alternate port role to the root port role, the logic causes transition directly from the blocking state to the forwarding state without requiring satisfaction of the conditions of the transitional state. For a port changing from the root port role to the designated port role, the logic causes transition directly from the forwarding state to the forwarding state immediately, or after a brief transition to the blocking state as discussed above.

For the case in which there are more than one alternate ports, the protocol entity stores information identifying a next root from among the ports in the candidate root port role. For example, the next root can be specified as the port having the lowest cost route to the root of the network.

This invention provides mechanisms to ensure that a loop-free alternate port (a candidate root port) is chosen as the root port when the original root port changes to a designated port on a bridge. This selection enables the restoration of data connectivity immediately. When such an alternate port is selected as the next root port (such as upon receiving inferior information on the root port), if the old root port becomes a designated port, the old root port can enter a forwarding state immediately as opposed to waiting. This determination is made independently of the mechanism used to propagate topology change information making the spanning tree converge and correct the learning of affected bridges more quickly.

The foregoing description of a preferred embodiment of the invention has been presented for purposes of illustration and description. This description is not intended to be exhaustive or to limit the invention to the precise forms disclosed. Obviously, modifications and variations will be apparent to practitioners skilled in this art. It is intended that the scope of the invention be defined by the following claims and their equivalents.

What is claimed is:

1. For a network comprising a plurality of local area network ("LAN") segments, a network device comprising:

a plurality of ports coupled to LAN segments in the network;

topology management resources which manage the plurality of ports according to a spanning tree algorithm, in order to set an active topology for the plurality of ports, including:

memory-storing parameters for specifying the active topology, the parameters including information for an identification of a root of the network, an identification of a port in the plurality of ports for a root port role to be used for a path to the root, an identification of one or more ports in the plurality of ports for designated port roles to be used for paths between the root and respective LAN segments coupled to the one or more ports, an identification of one or more ports in the plurality of ports for alternate port roles, and an identification of one or more ports in the alternate port role as a suitable candidate root port;

logic to compute states for ports in the plurality of ports in response to the parameters, including placing the port in the root port role into a forwarding state, placing the one or more ports in the designated port roles into a forwarding state, and placing the one or more ports in the alternate port roles into a blocking state; and logic to manage transition of the states of the ports in the plurality of ports in response to a change in the active topology, including:

for a port changing from the alternate port role to a designated port role, causing a transition from the blocking state to a transitional state, and then upon satisfaction of a condition of the transitional state, to the forwarding state, for a particular port changing from the candidate root port role to the root port role causing a transition from the blocking state into the forwarding state without requiring satisfaction of the condition of the transitional state, and for a particular port changing from the root port role to the designated port role causing a transition from the forwarding state into the forwarding state without requiring satisfaction of the condition of the transitional state.

2. The network device of claim 1, wherein the condition of the transitional state comprises expiry of an interval selected to ensure that there are no frames in the network that are forwarded by devices in the network according to the active topology before the change.

3. The network device of claim 1, wherein the transitional state includes a listening state during which frames indicating other changes in the active topology are accepted, but addresses for end stations identified in frames received on the port are not learned, and a learning state during which frames indicating other changes in the active topology are accepted, and addresses for end stations identified in frames received on the port are learned.

4. The network device of claim 1, wherein the parameters include information to identify one of the one or more ports having the candidate root port role as a next root, and wherein the logic to manage a transition from a blocking state into a forwarding state for the particular port changing from the alternate port role to the root port role causes a transition from the blocking state into the forwarding state without requiring satisfaction of the condition of the transitional state if the particular port is identified as the next root prior to the change.

5. The network device of claim 1, including logic to identify a port as a candidate root port if a message received on the port originates on a branch of the spanning tree that is different than a branch coupled to the root port of the device; or, originates from an entity between the device and a root bridge on the branch coupled to the root port.

6. The network device of claim 1, including logic to read messages received on an alternate port and originated from a root bridge for the tree and forwarded to the device from a designated bridge, carrying an identifier of a port on the root bridge and carrying an identifier of a port on the designated bridge.

7. The network device of claim 1, including logic to read messages received on an alternate port and originated from a root bridge for the tree and forwarded to the device from a designated bridged, carrying a count of intervening bridges from the root bridge.

8. The network device of claim 1, including logic to determine whether a MAC address of a designated bridge coupled to a port in the alternate port role has been learned through the port in the root port role.

9. For a network comprising a plurality of local area network ("LAN") segments interconnected by network devices according to an active topology established by a spanning tree protocol which provides at network devices a protocol entity managing a plurality for ports according to a blocking state, a listening state, a learning state, and a forwarding state, an improvement comprising:

storing parameters for specifying the active topology, the parameters including information for an identification of a root of the network, an identification of a port in the plurality of ports for a root port role to be used for a path to the root, an identification of one or more ports in the plurality of ports for designated port roles to be used for paths between the root and respective LAN segments coupled to the one or more ports, an identification of one or more ports in the plurality of ports for alternate port roles, and an identification of one or more ports in the alternate port role as having a candidate root port role; and for a topology change resulting in a particular port changing from the candidate root port role to the root port role and the previous root port changing to the designated port role, causing the previous root port to have the forwarding state without requiring transition through the listening and forwarding states.

10. The improvement of claim 9, including information to identify one of the one or more ports having the candidate root port role as a next root, and in response to the detection of a failure of the root port, causing the candidate root port identified as the next root to transition from the blocking state into the forwarding state.

11. The improvement of claim 9, including for a particular port changing from a root port role and a designated port role, causing a transition from the forwarding state to a temporary state in which the particular port blocks transmission of frames, and then transition back to the forwarding state.

12. The improvement of claim 9, wherein the spanning tree protocol comprises a protocol compliant with IEEE Standard 802.1D.

13. The improvement of claim 9, including propagating bridge protocol data units carrying an identifier of a port on the root bridge from which the bridge protocol data unit originated.

14. The improvement of claim 9, including identifying a port in the candidate root port role if the port is coupled to a different branch of the spanning tree than the port in the root port role.

15. The improvement of claim 9, including identifying a port in the candidate root port role if the port is coupled to a different branch of the spanning tree than the port in the root port role, or if the port is coupled to the same branch as the port in the root port role and has received configuration information within a time interval identified by a stored parameter.

16. The improvement of claim 15, including enabling identification of a port in the alternate port role as a candidate root port if a MAC address of a designated bridge coupled to the port has been learned through the port in the root port role.

17. The improvement of claim 15, including propagating bridge protocol data units carrying a count of intervening bridges from the root bridge, and enabling the identification of a port in the alternate port role as a candidate root port if the count received on the port is less than the count received on the port in the root port role.

18. For a network comprising a plurality of local area network ("LAN") segments interconnected by network devices according to an active topology established by a spanning tree protocol which provides at network devices a protocol entity managing a plurality for ports according to a blocking state, a listening state, a learning state, and a forwarding state, an improvement comprising:

propagating bridge protocol data units carrying an identifier of a port on the root bridge from which the bridge protocol data unit originated;

storing parameters for specifying the active topology, the parameters including: information for an identification of a root of the network, an identification of a port in the plurality of ports for a root port role to be used for a path to the root an identification of one or more ports in the plurality of ports for a designated port roles to be used for paths between the root and respective LAN segments coupled to the one or more ports, an identification of one more ports in the plurality of ports for alternative port roles, and an identification of one or more ports in the alternate port role as having a candidate root port role;

for a topology change resulting in a particular port changing from the candidate root port role to the root port role and the previous root port changing to the designated port role, causing the previous root port to have the forwarding state without requiring transition through the listening and forwarding states; and identifying a port in the candidate root port role if the port receives a bridge protocol data unit carrying an identifier of a port on the root bridge different from that carried by bridge protocol data units received at the root port.

19. For a network comprising a plurality of local area network ("LAN") segments interconnected by network devices according to an active topology established by a spanning tree protocol which provides at network devices a protocol entity managing a plurality for ports according to a blocking state, a listening state, a learning state, and a forwarding state, an improvement comprising:

propagating bridge protocol data units carrying an identifier of a port on the root bridge from which the bridge protocol data unit originated; and identifying a port in the candidate root port role if the port is coupled to a different branch of the spanning tree than the port in the root port role, or if the port is coupled to the same branch as the port in the root port role and has received configuration information within a time interval identified by a stored parameter.

20. The improvement of claim 19, including enabling identification of a port in the alternate port role as a candidate root port if a MAC address of a designated bridge coupled to the port has been learned th rough the port in the root port role.

21. The improvement of claim 19, including propagating bridge protocol data units carrying a count of intervening bridges from the root bridge, and enabling the identification of a port in the alternate port role as a candidate root port if the count received on the port is less than the count received on the port in the root port role.

* * * * *